(12) United States Patent
Yang et al.

(10) Patent No.: US 6,704,509 B1
(45) Date of Patent: Mar. 9, 2004

(54) COMPACT OPTICAL PERFORMANCE MONITOR

(75) Inventors: Wei Yang, Fremont, CA (US); Shu Zhang, Fremont, CA (US); Li Chen, Fremont, CA (US)

(73) Assignee: Bayspec, Inc., Fremont, CA (US)

( * ) Notice: Subject to any disclaimer, the term of this patent is extended or adjusted under 35 U.S.C. 154(b) by 697 days.

(21) Appl. No.: 09/715,765

(22) Filed: Nov. 17, 2000

(51) Int. Cl.[7] .................. H04B 10/08; H04B 10/00; H04J 14/00
(52) U.S. Cl. .................. 398/34; 398/33; 398/68; 398/131
(58) Field of Search .................. 398/33, 34, 68, 398/84, 85, 86, 87, 88, 122, 123, 131

(56) References Cited

U.S. PATENT DOCUMENTS

| | | | |
|---|---|---|---|
| 5,121,985 A | * | 6/1992 | Albrecht et al. ............ 356/128 |
| 5,796,479 A | * | 8/1998 | Derickson et al. .......... 356/326 |
| 6,504,976 B1 | * | 1/2003 | Polynkin et al. .............. 385/37 |

* cited by examiner

Primary Examiner—Jason Chan
Assistant Examiner—Dzung Tran
(74) Attorney, Agent, or Firm—Justin Boyce Dechert LLP (57) ABSTRACT

A monitoring system provides for monitoring the optical performance of a plurality of different channels of a fiber optic network, each channel having an associated channel wavelength. The system includes: means for generating a calibration signal including a plurality of stable calibration wavelengths; means for combining a tapped communication signal and the calibration signal to generate a combined signal; and a multi-channel monitoring device. The monitoring device includes: an input optical fiber for receiving the combined signal, and for radiating an input light beam including the communication wavelengths and the calibration wavelengths; a detector unit having an array of pixel detector elements each being responsive to light beams incident thereon, and operative to generate an associated data signal; collimating and focusing means for collimating and focusing beams propagating between the fiber end and the detector unit; and a transmissive grating assembly for diffracting and spatially separating beams propagating between the input fiber end and the detector unit. The grating assembly, collimating and focusing means, and pixel detector elements are configured so that the diffracted beams are spatially separated and focused onto associated ones of the detector elements according to their wavelengths. A data processing unit receives the data signals from the detector unit, and is operative to provide information indicative of the intensities and wavelengths associated with each of the channels of the main communication signal. The processing unit uses the calibration wavelengths as standards to calibrate positional relationships between the spatially diffracted beams and the associated pixel detector elements.

28 Claims, 7 Drawing Sheets

COMPACT OPTICAL PERFORMANCE MONITOR

BACKGROUND OF THE INVENTION

1. Field of the Invention

The present invention relates generally to optical devices, and more particularly to a method and apparatus for monitoring the performance of each of a plurality of channels propagated via an optical medium.

2. Description of the Prior Art

The explosive growth of telecommunication and computer communications, especially in the area of the Internet, has created a dramatic in increase in the volume of worldwide data traffic which has placed an increasing demand for communication networks providing increased bandwidth. To meet this demand, fiber optic (light wave) communication systems have been developed in order to harness the enormous usable bandwidth (tens of tera-Hertz) of a single optical fiber transmission link. Because it is not possible to exploit all of the bandwidth of an optical fiber using a single high capacity channel, wavelength division-multiplexing (WDM) fiber optic systems have been developed to provide transmission of multi-carrier signals over a single optical fiber thereby channelizing the bandwidth of the fiber. In accordance with WDM technology, a plurality of superimposed concurrent signals are transmitted on a single fiber, each signal having a different wavelength. WDM technology takes advantage of the relative ease of signal manipulation in the wavelength, or optical frequency, domain, as opposed to the time domain. In WDM networks, optical transmitters and receivers are tuned to transmit and receive on a specific wavelength, and many signals operating on distinct wavelengths share a single fiber.

Wavelength multiplexing devices are commonly used in fiber optic communication system to generate a single multi-carrier main communication signal stream, in response to a plurality of concurrent signals having different wavelengths received from associated sources or channels, for transmission via a single fiber. At the receiving end, wavelength demultiplexing devices are commonly used to separate the composite wavelength signal into the several original signals having different wavelengths.

The transmission capacity of an optical network is proportional to the number of channels carried by the main communication signal stream in the optical network. Dense wavelength division multiplexing (DWDM) systems provide many channels with narrowly spaced wavelength separations, such as 50, or 100 GHz channel spacing which corresponds to a wavelength separation of 0.4 nm and 0.8 nm, respectively. The number of channels deployed in WDM optical networks is continually increasing. Currently, it is common for WDM optical networks to deploy 16, 32, and 40 channels. DWDM systems providing very large number of channels (e.g., 80 and 160 channels) are likely to be deployed in the foreseeable future.

In optical networks having a large number of channels, the stability of the channels (both in terms of the amplitude and wavelengths) is critical. The stability of channels in optical networks is largely dependent on the operational characteristics of optical transmitters used in the network. It is well known that as lasers age and as the operational temperature of the lasers change, the wavelengths and amplitude of the light emitted by the lasers tends to vary. As the number of channels deployed in an WDM optical network increases, wavelength drifts are more likely to result in interference between channels because the channel spacing is narrower. Therefore, as the number of channels deployed in an WDM optical network increases, wavelength drifts and amplitude variations are increasingly more likely to cause data error or transmission failures.

It is important for engineers to be able to monitor the performance of the communications channels in an optical network. Conventional optical network performance monitoring devices typically include a detection element responsive to the main communication signal stream including all of the channels carried by the network. In these conventional devices, the element is responsive to the combined amplitudes of all of the channels carried by the main signal stream, and operative to generate a data signal indicative of the power level provided collectively by all of the channels of the main communications signal stream. This data signal is used to determine the overall health, or performance level, of all of the channels of the network.

As the number of channels increases and as the channel spacing is reduced in optical networks, conventional optical performance monitoring devices become less effective and less useful because such detectors can only be used detect the total power provided collectively by all wavelengths of the main communication signal stream. Conventional optical performance monitoring devices do not provide reliable information indicating the performance of individual channels of the main communication signal stream of as network. If the power level of one of the channel decreases, while the power level of another one of the channel increases, the total power level measured by the conventional device for the main communication signal stream may remain constant, thereby providing an inaccurate indication of the performance of the network.

What is needed is an optical performance monitoring system that provides for monitoring the performance of each of a plurality of channels of a main signal stream propagated via an optical network.

SUMMARY OF THE INVENTION

It is therefore an object of the present invention to provide an optical performance monitoring system that provides for monitoring the performance of each of a plurality of channels of a main signal stream propagated via an optical network.

Another object of the present invention to provide an optical performance monitoring system that provides wavelength and amplitude information associated with each of the channels of an optical network.

A further object of the present invention to provide a compact and stable optical performance monitoring device that yields precise information data indicating the wavelengths and amplitudes associated with each of the channels of an optical network.

Another important object of the present invention is to provide DWDM device that is easy to manufacture in large quantities using components that are easy to make and assemble.

Briefly, a presently preferred embodiment of the present invention provides a system for monitoring the optical performance of a fiber optic network including an optical fiber carrying a main communication signal stream having a plurality of different channels each having an associated channel wavelength. The system includes: a fiber tapping means communicatively coupled with the main optical fiber for extracting a tapped communication signal from the main signal stream, the tapped communication signal including the plurality of channels each having an associated communication wavelength; means for generating a calibration signal including a plurality of calibration wavelengths; means for combining the tapped communication signal and the calibration signal to generate a combined signal including the communication wavelengths and the calibration wavelengths; and a multi-channel monitoring device.

The multi-channel monitoring device includes: an input optical fiber for receiving the combined signal, and having an input fiber end for radiating an input light beam including the communication wavelengths and the calibration wavelengths; a detector unit having an array of pixel detector elements each being responsive to light beams incident thereon, and operative to generate an associated data signal; collimating and focusing means for collimating and focusing beams propagating between the fiber end and the detector unit; and a transmissive grating assembly for diffracting and spatially separating beams propagating between the input fiber end and the detector unit. The grating assembly, collimating and focusing means, and pixel detector elements are configured so that the diffracted beams are spatially separated and focused onto associated ones of the detector elements according to associated ones of the communication wavelengths and the calibration wavelengths. In an embodiment, the grating assembly includes a volume phase grating (VPG) fabricated from high efficiency DCG material. The grating is disposed at a predetermined angular orientation with respect light beams incident thereon in order to optimize diffraction efficiency, and to optimize a first order of diffraction for a predetermined wavelength range.

The system further includes: a data processing unit for receiving the data signals from the detector unit, and being operative to provide information indicative of the intensities and wavelengths associated with each of the channels of the main communication signal. A display unit may be used to display graphical indicia, including spectral diagrams, indicative of the performance of each of the communication channels. The data signal processing unit is operative to perform a calibration process for calibrating positional relationships between the spatially diffracted beams associated with the communication wavelengths and the associated pixel detector elements, the calibration process using the calibration wavelengths as standards to calibrate the positional relationships.

Also in an embodiment, the means for generating a calibration signal includes: a light source providing a source light beam; a plurality of bandpass filters each being communicatively coupled to receive the source light beam from the source, and being operative to filter the source light beam, and to pass an associated one of the plurality of calibration wavelengths; and means for combining the calibration wavelengths passed by the filters to provide the calibration signal. In one embodiment, each of the bandpass filters includes a fiber Bragg grating.

Important advantages of the optical performance monitoring device of the present invention is that it is compact and stable, and yields precise performance information indicative of the wavelengths and amplitudes associated with each of the channels of an optical network The forgoing and other objects, features, and advantages of the present invention will be apparent from the following detailed description of the preferred embodiment which makes reference to the several figures of the drawing.

DETAILED DESCRIPTION OF THE PREFERRED EMBODIMENTS

Figure 1:
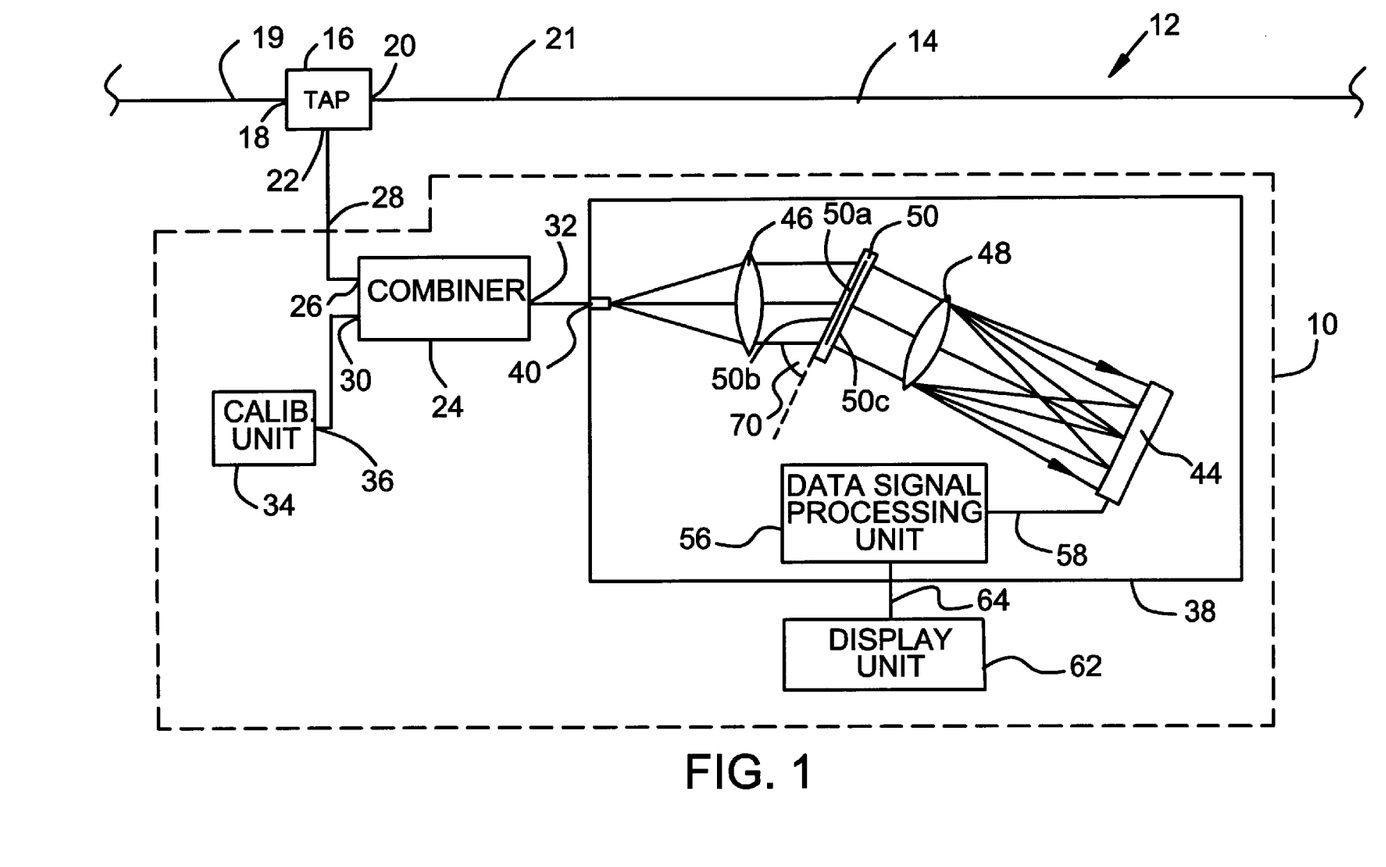
FIG. 1 is a block diagram generally illustrating an optical performance monitoring system in accordance with the present invention as used in a fiber optic network, the system including a multi-channel optical performance monitoring device having a transmissive diffraction grating and a detector unit for monitoring the intensities and wavelengths of a plurality of different channels carried by a main communication signal stream transmitted via the fiber optic network, and a calibration signal generating unit.

FIG. 1 shows a block diagram generally illustrating an multi-channel optical performance monitoring device at 10, in accordance with the present invention, as used in a dense wavelength division and multiplexing fiber optic network 12. The monitoring system 10 provides reduced physical size, high optical throughput, and the capability of simultaneously monitoring each of a plurality of channels carried by the fiber optic network 12. The fiber optic network 12 includes a main optical fiber 14 carrying a main communication signal stream having a plurality of communication channels (e.g., 32 channels) each being propagated at an associated wavelength. The monitoring system 10 provides independent performance information associated with each of the communication channels of the network as further explained below. The performance information includes frequency (wavelength) performance information, amplitude performance information, and signal to noise ratio information associated with each of the communication channels.

The monitoring system 10 is used with a fiber optic coupler, or splitter 16 which is used to extract a tapped communication signal from the main communication signal stream carried by the main optical fiber, wherein the tapped communication signal is to be monitored by the optical performance monitoring system 10. The splitter 16 includes: an input 18 for receiving the main communication signal stream at a point 19 of the main optical fiber; a first output 20 providing throughput of the main signal with minimal power reduction (e.g., 98–97% of the total light power is provided without disturbance of the main signal) to a second point 21 of the main optical fiber; and a second output 22 providing the tapped communication signal which carries all channels (at the associated wavelengths) of the main communication signal stream at a reduced optical power (e.g., 2–3% of the optical power of the main communication signal).

The monitoring system 10 includes: a fiber optic combiner 24 having a first input 26 for receiving the tapped communication signal from the splitter via a fiber optic cable 28, a second input 30, and an output 32; a calibration signal generating unit 34 having an output 36 for providing a wavelength calibration signal (including a plurality of fixed wavelengths?) to the second input 30 of the combiner 24; and a monitoring device 38 having an input optical fiber 40. The combiner 24 combines the tapped communication signal received at its first input 26 with the wavelength calibration signal received at its second input 30 to provide a device input signal to the input optical fiber 40 of the monitoring device 38, the device input signal including components of the wavelength calibration signal and the tapped communication signal which includes each of the wavelengths representing communication channels of the main communication signal stream.

The monitoring device 38 includes: the input optical fiber 40 which has a fiber end providing for radiating light beams; an optoelectrical detector unit 44 having an array of pixel detector elements (not shown) for detecting light beams incident thereon; first and second lenses 46 and 48 for collimating and focusing beams propagating between the fiber end and the detector unit 44, each of the lenses having a focal length associated therewith; a transmissive grating assembly 50, which preferably includes a volume phase grating (VPG) made from high efficiency DCG materials, for diffracting beams propagating between the first and second lenses 46 and 48; a data processing unit 56 communicatively coupled with the detector unit 44 as shown by a line 58; and a display unit 62 communicatively coupled with the data processing unit 56 as shown by a line 64.

The volume phase grating assembly 50 is disposed in an angular orientation to optimize diffraction efficiency and to optimize the first order of diffraction for a preferred wavelength range. In one embodiment, the grating 50 is oriented at an angle 70 relative to the laser beam incident thereon. The angle 70 is determined based on a number of optical parameters for best performance. Diffracted, spatially separated beams are then focused by the second lens 48 onto the detector unit 44. The lenses 46 and 48 are optimized for the designed wavelength range. The second lens 48 has a focal plane located at the surface of the pixel detector elements of the detector array unit 44. The focal length of the second lens 48 is designed to spread the whole spectrum range of the input beam to cover the length of the detector array.

The transmissive grating assembly 50 includes at least one substrate and a diffractive element. In the depicted embodiment, the grating assembly 50 includes first and second substrates 50a and 50b, and a diffractive element 50c disposed between the first and second substrates. Each of the first and second substrates 50a and 50b may be formed from low scattering glass having surfaces coated with an antireflection coating to enhance the passage of radiation. In one embodiment, the diffractive element 50c includes a volume phase grating (VPG) which provides very high optical dispersions for diffracting various wavelengths of the input signal at different angles. The diffractive element 50c preferably includes a holographic element comprising a photosensitive medium such as a photo-polymer material or DCG (e.g., dichromate gelatin) that provides a volume hologram. The photosensitive media are preferably materials that provide for high spatial resolution in order to provide the diffractive element 50c with a high groove density, thus providing high spectral resolution. Moreover, the photosensitive media are preferably materials that have low scatter, low optical noise and the capability of transmitting a range of wavelengths of interest. The photosensitive medium provides for a high diffractive efficiency and wide waveband operation. In one embodiment, the diffractive element 50c is formed by performing a holographic process utilizing the photosensitive medium. The fabrication of DCG and photopolymer holographic elements for different purposes has been widely described in several references, for example, "Dichromated Gelatin for the Fabrication of Holographic Optical Elements" prepared by B. J. Chang and C. D. Leonard: Applied Optics, 18, 2407–2417 (1979). The manufacturing cost of forming holographic elements is low because the process is basically a photographic process.

The detector unit 44 converts light energy radiated onto the pixel detector elements into electrical charge which is collected and readout by the data processing unit 56, and displayed by the display unit 62 which may be located locally or remotely. In one embodiment, each of the pixel detector elements of the detector unit is fabricated using Indium Gallium Arsenide (InGaAs) which is sensitive to the infrared wavelengths used for telecommunications. The data processing unit 56, which may be any type of data processing unit known to those skilled in the art, may include analog to digital (A/D) converters, and amplifiers.

In operation, the input optical fiber 40 radiates a multichannel input beam carrying wavelengths including the main communication signal wavelengths and the calibration wavelengths toward the first lens 46 which collimates the input beam toward the grating assembly 50 so that the grating most efficiently diffracts the beam. The second lens 48 receives dispersed beams from the grating assembly 50, and focuses the dispersed beams to its focal plane at the surface of the pixel detector elements of the detector unit 44. After passing through the second lens 48, the light of various wavelengths is focused onto associated ones of the different pixel detector elements (not shown) of the detector unit 44 according to the associated wavelengths.

Figure 2:
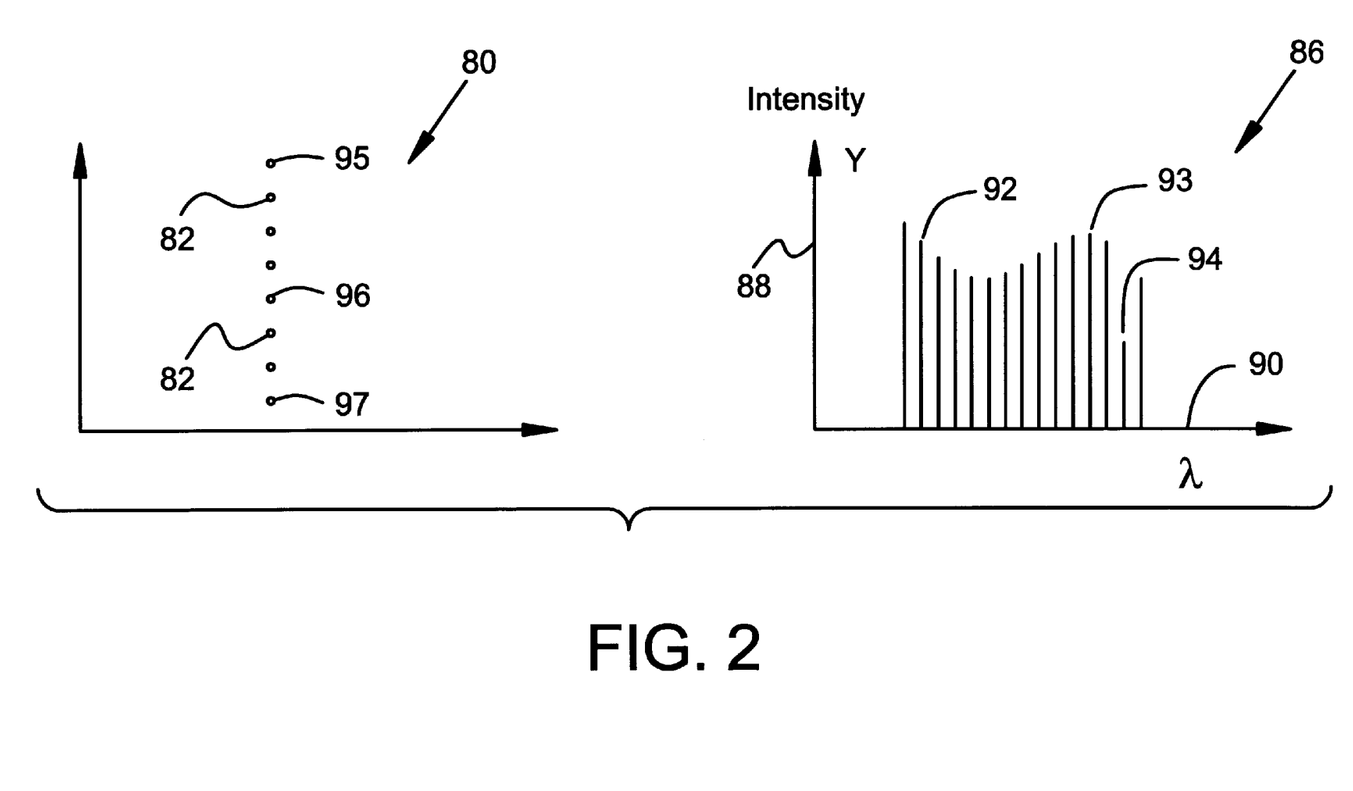
FIG. 2 is a diagram generally illustrating exemplary positions of a plurality of focus points of light beams associated with each of the channels, the focus points being incident on the array of pixel detector elements of the monitoring device of FIG. 1, each of the beams having an associated intensity and an associated wavelength which may vary depending on performance of the optical network as illustrated by a plot of intensity values as a function of wavelength.

FIG. 2 shows a diagram generally illustrating an array at 80 of focus points 82 of light beams incident on the detector unit 44 (FIG. 1) of the monitory device. The light beam associated with the focus points 82 result from collimating, diffracting, and focusing of the optical input beam by the optical components lenses 46 and 48, and grating assembly 50 (FIG. 1) of the multi-channel monitoring device 38 (FIG. 1). As described above, the multi-channel input beam radiated from the fiber end of the input optical fiber 40 (FIG. 1) includes: the wavelengths associated with each of the channels of the main communication signal stream carried by the main optical fiber 14 (FIG. 1); and the calibration wavelengths generated by the calibration signal generating unit 34 (FIG. 1).

As mentioned above, the intensities and frequencies (and thus the wavelengths) associated with the channels of the main communication signal stream may vary and drift as a result of variations in performance of the optical network 12 (FIG. 1). FIG. 2 also shows a graph at 86 illustrating intensities of optical beams associated with channels of the main signal stream plotted on an intensity axis 88 as a function of associated wavelengths plotted on a wavelength axis 90. The graph 86 shows three exemplary intensity values 92, 93, and 94 and associated wavelengths each being associated with a corresponding particular one of the focus points 95, 96, and 97.

As further explained below, the detector unit 44 (FIG. 1) is responsive to light beams included thereon, and operative to generate associated data signals indicative of the intensity of incident light at corresponding wavelengths. The data signals are provided to the processing unit 56 (FIG. 1) which provides for analyzing by data signals to evaluate the performance of the optical network for individual wavelengths based on the measured data signals. As an example, the channel associated with the wavelength value at 93 (associated with focus point 96) will be determined to be performing well because its associated intensity value is high, while the channel of wavelength 94 (associated with focus point 97) is determined to be performing poorly because its associated intensity value is low.

Based on the results of the monitoring by the monitoring system 10 (FIG. 1), it is possible to determine defective or malfunctioning channels and to switch communication signals propagating on a defective channel to a different channel.

Figure 3:
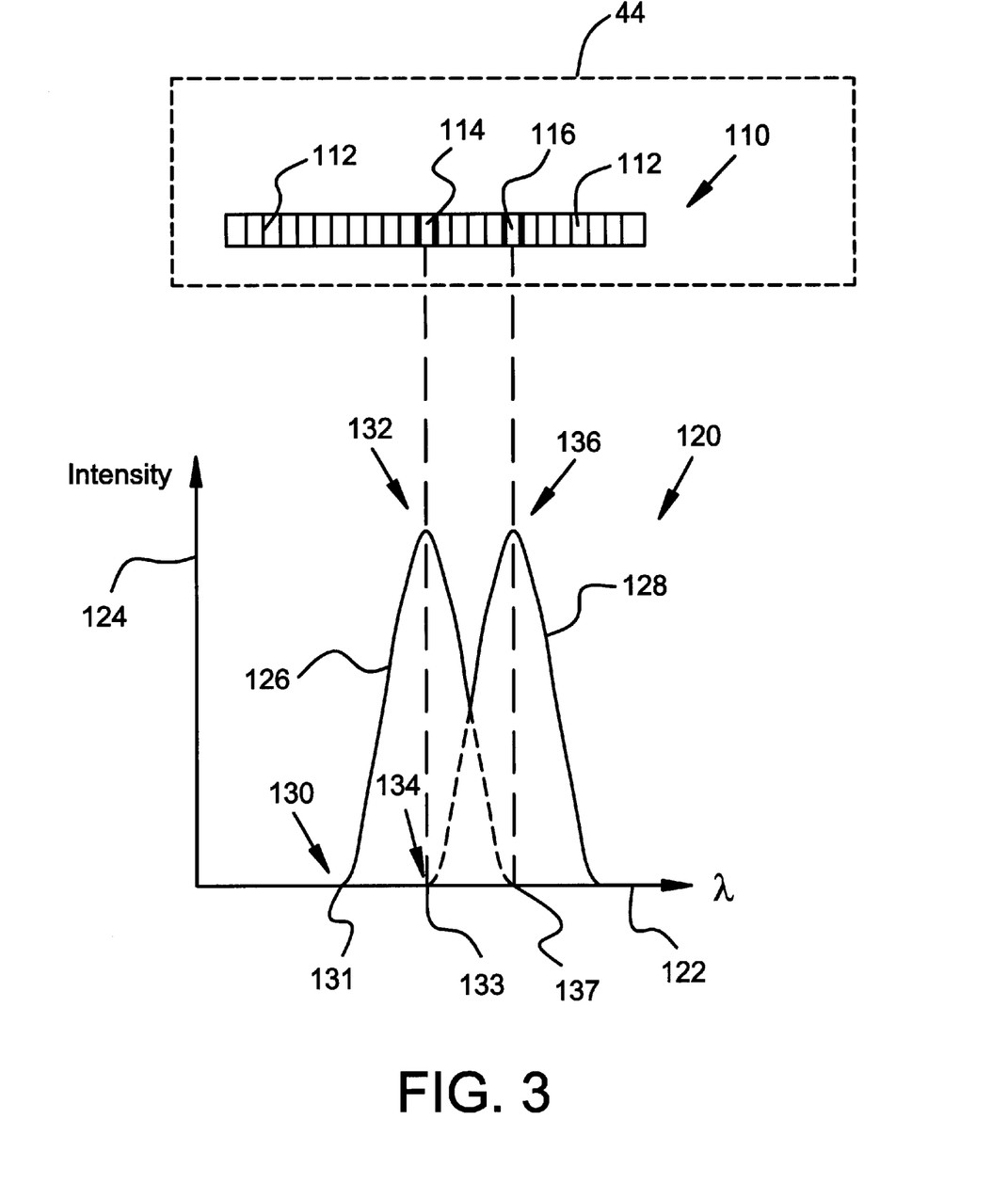
FIG. 3 is a diagram generally illustrating an array of light sensitive pixel detector elements of the detector unit of FIG. 1, the detector elements being responsive to light beams received from the transmissive diffraction grating, and operative to generate data signals indicative of the intensity values and wavelengths associated with channels of the main communication signal stream.

FIG. 3 shows a diagram generally illustrating an array at 110 of light sensitive pixel detector elements 112 of the optoelectrical detector unit 44 (FIG. 1). Each of the pixel detector elements 112 of the array is positioned to receive light beams of a corresponding predetermined wavelength, the light beams being diffracted and spatially separated by the transmissive diffraction grating 50 (FIG. 1) according to their wavelengths. In the described embodiment, the array 110 includes a single row of detector elements 112. However, in alternative embodiments, the array may include a plurality of rows of detector elements. In varying embodiments of the present invention, the number of pixel detector elements 112 and the size of each pixel may vary. In one embodiment, the detector array 110 includes 256 pixel detector elements, each having a pixel size of 50 microns. In another embodiment, the array includes 512 detector elements, each having a pixel size of 25 microns. Each of the pixel detector elements 112 is sensitive to incident beams of at least one associated wavelength incident thereon, and is operative to convert the light energy of the incident beams into electrical charges to generate data signals indicative of the intensity of the associated incident light beam. Each of the detector elements 112 is fabricated using a material that is suitable for use in an interested communication wavelength range. In one embodiment, each of the detector elements includes some type of III–V family compound semiconductors, (e.g., Indium Gallium Arsenide (InGaAs) materials, or any other suitable materials). As further explained below, in a preferred embodiment, the optoelectrical detector unit 44 (FIG. 1) is designed so that several pixel detector elements 112 of the array monitor a single wavelength in order to achieve highest reliability.

In the depicted embodiment, the array 110 of pixel detector elements 112 includes target detector elements such as the elements at 114 and 116, each being positioned to receive light beams of a corresponding predetermined wavelength, the light beams being diffracted and spatially separated by the transmissive diffraction grating 50 (FIG. 1) according to their wavelengths. As described above, the actual wavelengths of channels of the main communication signal stream may wander, or drift, depending on the performance of the optical network 12 (FIG. 1). The optoelectrical detector unit 44 provides for measuring the wavelength variations of channels of the optical network by providing additional pixel detector elements 112 in addition to the target one of the detector elements for each channel wavelength of the main communication signal stream. At least three pixel detector elements 112 are needed to resolve the spectral peak of an incident light beam.

FIG. 3 also shows a spectral diagram at 120 including a frequency or wavelength axis 122 and an intensity axis 124, the diagram 120 illustrating a spectrum of a first exemplary channel 126 of the main communication signal stream, and a spectrum of a second exemplary channel 128 adjacent to the first channel 126 of the main communication signal stream. The spectrum of each of the channels includes associated minima and an associated maximum or peak intensity level. In the depicted example: the first channel 126 includes a first minimum intensity level 130 at a wavelength (frequency) value 131, and a maximum intensity level 132 at a wavelength value 133; and the second channel 128 includes a first minimum intensity level 134 at the wavelength value 133, and a maximum intensity level 136 at a wavelength value 137. Note that the target detector elements 114 and 116 are positioned to receive first and second incident light beams associated with the maxima 132 and 136 of the first and second channels respectively, the beams being diffracted and spatially separated by the grating assembly 50 (FIG. 1).

In order to be able to resolve the wavelengths of the first and second channels 126 and 128, the wavelength 133 associated with the maximum intensity level 132 of the first channel must be less than the wavelength 133 associated with the minimum 134 of the second channel. Note that in the depicted example, the wavelength 133 of the maximum intensity level 132 of the first channel is equal to the wavelength 133 of the minimum 134 of the second channel. Therefore, in the depicted embodiment, the wavelengths of the first and second channels may be resolved. Note that in the depicted example, the first and second target pixel detector elements 114 and 116 associated with the adjacent first and second channels are separated by four pixel detector elements 112. In accordance with Rayleigh criteria, at least three pixel detector elements 112 are required to resolve the wavelengths of the first and second adjacent channels.

As mentioned above, output signals are provided by the detector unit 44 (FIG. 1) to the data signal processing unit 62 (FIG. 1). The signal amplitude from each of the pixel detector elements is measured electronically in order to determine the intensity level of the light at the corresponding wavelengths. The measured signal levels provide information indicative of the performance of each of the individual channels of the optical network 12 (FIG. 1).

The resolution of the optical performance monitoring device 38 (FIG. 1) may be determined based on factors including the dispersion of the volume phase grating 50 (FIG. 1), the focal length of the lens 48 (FIG. 1), and the number of pixel detector elements 112 in the array 110. The linear dispersion of the volume phase grating 50 (FIG. 1) is defined by relationship (1), below $$\delta L/\delta\lambda = f \cdot (\delta L/\delta\theta) = (f \cdot m)/(d \cdot \cos\theta) \quad (1)$$

where L represents the linear dispersion of the device 38 (FIG. 1), f represents the focal length of the lens 48 (FIG. 1), θ represents the diffraction angle 70 (FIG. 1), d represents the grating period of the grating assembly 50 (FIG. 1), m represents the diffraction order (typically, M=1), λ represents the wavelength of the incident beam, and Äλ represents the smallest difference between adjacent communication wavelengths that can be resolved.

The resolution of the device 38 (FIG. 1) may be defined in accordance with relationship (2), below $$R = \lambda / \ddot{A}\lambda \quad (2)$$

As is used widely in spectrometer design, a Rayleigh criterion is used for defining resolution. As shown in FIG. 3, two maximum of equal intensity are considered separated or resolved when the minimum adjacent to one of the maxima coincides with the maximum of the other.

In practice when designing the optical performance system it is calculated in such a way for designing and choosing the practical optical channel dispersion parameters. As an example, assuming a 512-pixel detector array, and assuming that 40 channels are to be monitored in the C-band (e.g., 32 nm wavelength range) the linear dispersion of the device 38 (FIG. 1) is 32 nm/512 pixel=0.0625 nm/pixel. Conservatively, 3 pixels are required to resolve a spectral peak. Therefore, the spectral resolution of the worst case for this optical monitoring system would be 3×0.0625=0.1875 nm, less than 25 GHz at the popular 1550 nm DWDM communication wavelength region. It is more than sufficient to resolve the wavelengths with channel spacing of 100 GHz, 50 GHz or even the 25 GHz in a DWDM network.

Once the linear dispersion is chosen, a focal length f of the lens 48 (FIG. 1) is chosen so that the grating density (1/d) of the grating assembly 50 (FIG. 1) can be calculated in terms grooves/mm. The spectral separation optics described above are designed to optimize the resolution of the device 38 (FIG. 1).

Figure 4A:
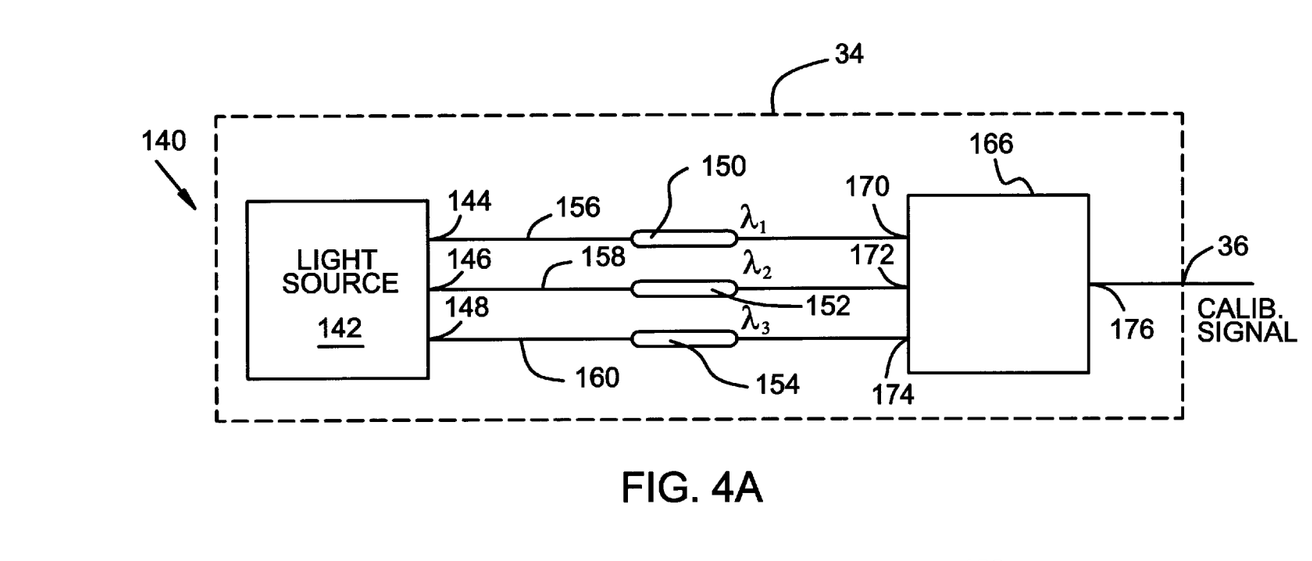
FIG. 4A is a schematic block diagram of the calibration signal generating unit of the optical performance monitoring device of FIG. 1.

FIG. 4A shows a more detailed block diagram illustrating components of the calibration signal generating unit 34 (FIG. 1) at 140. The signal generating unit 34 provides the calibration signal including at least two stable wavelengths. In the below described embodiment, the signal generating unit 34 generates a calibration signal including three stable wavelengths $\lambda_1$, $\lambda_2$, and $\lambda_3$. The depicted calibration signal generating unit at 140 includes a light source 142 having three outputs 144, 146, and 148 each emitting a light beam. In the preferred embodiment, the light beam generated at each of the outputs 144, 146, and 148 is a broadband spectrum light beam in the interested communication wavelengths (e.g., in the wavelength range of 1500–1650 nm). However, in an alternative embodiment, the light beam generated at each of the outputs 144, 146, and 148 is a single wavelength light beam. A more accurate selection of the wavelength can be determined if the optical channel monitor is optimized for use in a C-band or L-band communication network. The light source 142 preferably includes light emitting diode (LED) sources operating in the wavelength range, or an amplified spontaneous emission (ASE) source based on erbium doped fibers pumped by a 980 or 1480 nm laser. In an embodiment, the light source 142 is temperature stabilized for its operation stability. The calibration signal generating unit 140 also includes three narrow band filters 150, 152, and 154 each being communicatively coupled to receive the broadband spectrum light beam from the associated one of the outputs 144, 146, and 148 of the light source 142, and being operative to filter the broadband spectrum light beam to generate an associated one of three different stable single wavelength optical signals. Each of the narrow band filters 150, 152, 154 only allows a very narrow region of wavelength to pass in the transmission mode. In one embodiment, each of the filters 150, 152, and 154 is implemented as a fiber Bragg grating. In the preferred embodiment, each of the filters 150, 152, 154 is operative in a reflection mode and in a transmission mode. Fiber Bragg gratings are widely used in the optical communication industry and are commercially available.

The band pass of the wavelength filtered by each of the filters 150, 152, 154 can be as narrow as 0.2 nm or narrower. If a thermal electrical cooler (TEC) is used to temperature stabilize the gratings, the wavelength each may pass will remain constant. Therefore, the setup of grating bandpass filters in conjunction of wideband source is sufficient for using as a wavelength calibration standard.

In accordance with the present invention, each of the filters 150, 152, and 154 passes a different calibration wavelength. In one embodiment, the first filter 150 passes a wavelength that is lower than the multichannel working wavelength, the second filter 152 passes a wavelength in the middle of the working wavelength, and the third filter 154 passes a wavelength longer than the working wavelength. A fiber optic combiner 166 includes: three inputs 170, 172, and 174 coupled to receive the three passed wavelengths $\lambda_1$, $\lambda_2$, and $\lambda_3$ from the filters 150, 152, and 154 respectively; and an output 176 for providing the calibration signal including the calibration wavelengths $\lambda_1$, $\lambda_2$, and $\lambda_3$ to the output 36 of the calibration unit. As explained above, the calibration signal provided at the output of the calibration unit 34 (FIG. 1) is provided to the input 30 of the combiner 24 (FIG. 1).

Figure 4B:
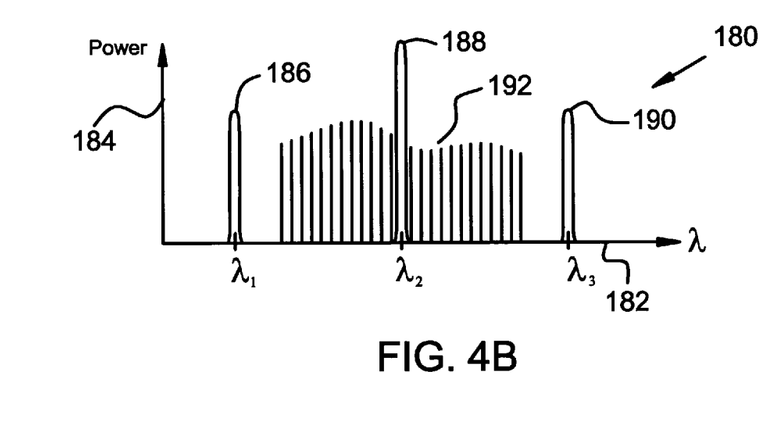
FIG. 4B is a diagram illustrating a plot of data signal values as a function of wavelength values associated with channels of the of the main communication signal stream, the data signal values being generated by corresponding ones of the pixel detector elements of the detector unit of FIG. 1 in response to light beams received from the diffraction grating.

FIG. 4B shows a graph at 180 illustrating measured wavelength and amplitude information associated with channels of the main communication signal stream carried by the main optical fiber 14 (FIG. 1), and wavelength and amplitude information associated with the stable calibration wavelengths $\lambda_1$, $\lambda_2$, and $\lambda_3$ generated by the calibration signal generating unit 34 (FIG. 1). The graph 180 includes a wavelength axis 182, and a power value axis 184. The measured wavelength and amplitude information, which is generated by the detection unit 44 (FIG. 1) in response to spatially separated beams incident thereon as described above, is shown plotted on the graph 180.

As mentioned above, the three calibration wavelengths $\lambda_1$, $\lambda_2$, and $\lambda_3$ are radiated from the end of the fiber input 40 (FIG. 1) along with the communication wavelengths of the main communication signal stream, diffracted and spatially separated by the grating assembly 50 (FIG. 1), and focused onto associated target ones of the pixel detector elements 112 (FIG. 3). As explained above, the opto-electronic detector unit 44 (FIG. 1) is responsive to the calibration wavelengths and the communication wavelengths of the main communication signal stream, and operative to generate data signals indicative of the wavelengths and amplitudes. The data signal processing unit is responsive to the data signals, and operative to generate a spectral diagram on the display unit 62 (FIG. 1) for each of the channels of the main communication signal stream. Peak power values, indicative of light beam intensities, associated with the calibration wavelengths $\lambda_1$, $\lambda_2$, and $\lambda_3$ are shown at 186, 188, and 190 respectively. Peak power values, indicative of light beam intensities, associated with the wavelengths of the main communication signal stream are shown at 192.

Wavelengths on the spectral scale, and 93 indicates all the wavelengths of the working channels. Because the calibration wavelengths $\lambda_1$, $\lambda_2$, and $\lambda_3$ are known, they can be used as standards to calibrate positional relationships between the wavelengths of the main communication signal stream and the pixel detector elements 112 (FIG. 3) of the array. The data signal processing unit 56 (FIG. 1) is operative to perform a calibration process for calibrating the positional relationships between the wavelengths of the main communication signal stream and the pixel detector elements. In one embodiment, the calibration process is implemented as computer readable instructions executed by a processor of the data signal processing unit to perform the calibration process in real time. The calibration process provides for the elimination of errors in the performance results which could result from variations in temperature, and possible variations in the physical structure of the components of the optical performance monitoring device 38 (FIG. 1). Because the calibration process provides for real time calibration adjustments, the wavelength calibration can be dynamically corrected.

Figure 5:
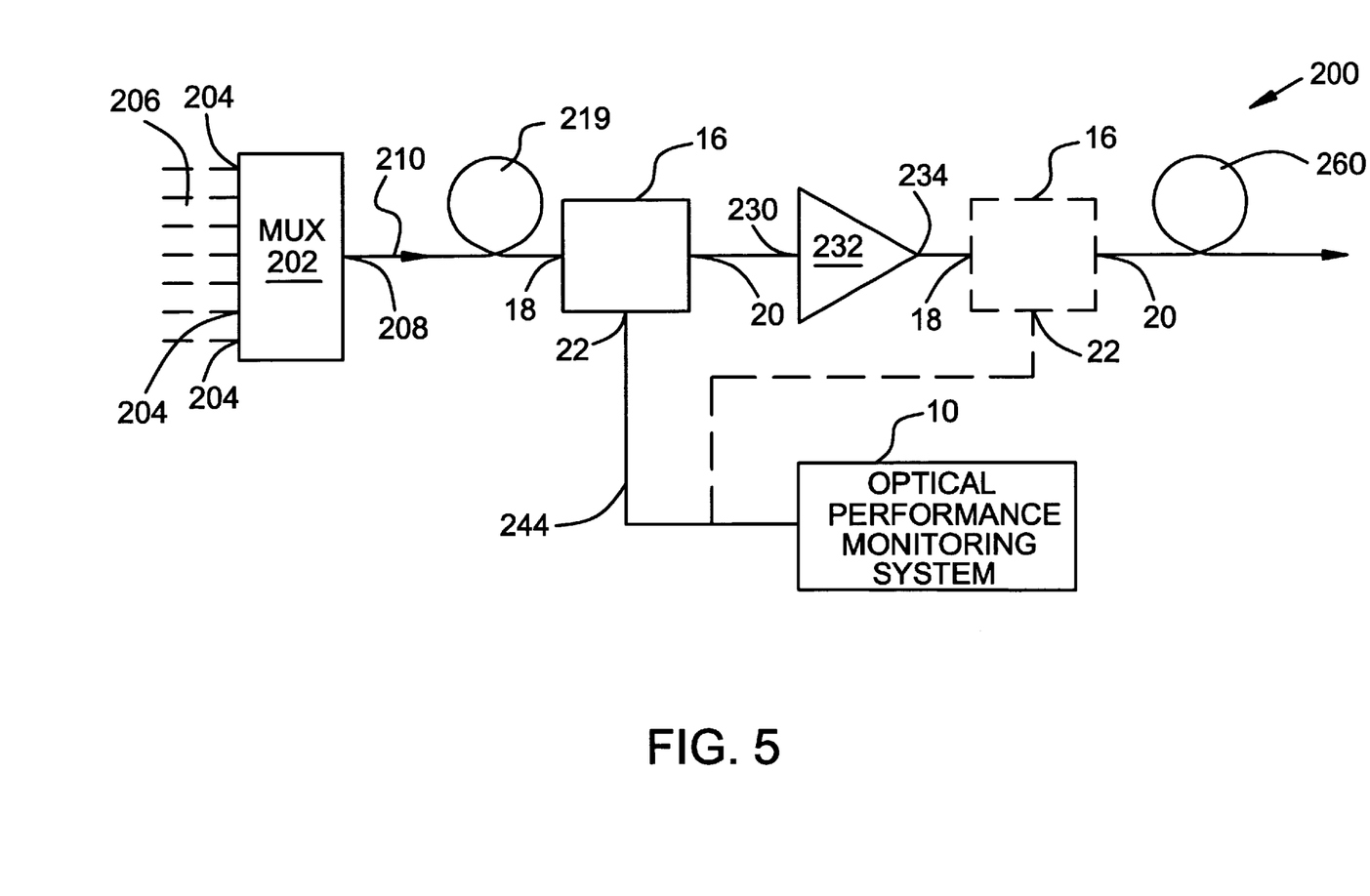
FIG. 5 is a block diagram generally illustrating alternative uses of the optical performance monitoring system in accordance with the present invention in a fiber optic network.

FIG. 5 shows a block diagram generally illustrating alternative uses of the optical performance monitoring system 10 in accordance with the present invention in a fiber optic network 200. The network 200 includes a dense wavelength optical multiplexer 202 having a plurality of inputs 204 each receiving one of a plurality of optical channel signals 206, and an output 208 providing a multi-channel communication signal stream (including all of the optical channel signals 206) via a main fiber 210.

As in the network 12 (FIG. 1), the monitoring system 10 is used in the network 200 with a fiber optic coupler, or splitter 16 as described above with reference to FIG. 1. In a first embodiment, the splitter 16 and performance monitoring system 10 are deployed in the network 200 so that the input 18 of the splitter receives the main communication signal stream at a point of the main optical fiber 210 that is disposed at a specified distance from the output of the multiplexer 202 (as is illustrated by a fiber loop 219) proximate an input 230 of an optical amplifier 232. In this embodiment, the splitter 16 provides the tapped communication signal carrying all channels of the main communication signal stream at a reduced optical power to the optical performance monitoring system 10 which operates as described above to monitor the main signal stream as tapped at the point proximate the input 230 of an optical amplifier 232. In another embodiment, the splitter 16 and performance monitoring system 10 are deployed in the network 200 to monitor the main signal stream as tapped at a point proximate an output 234 of the optical amplifier 232.

Figure 6:
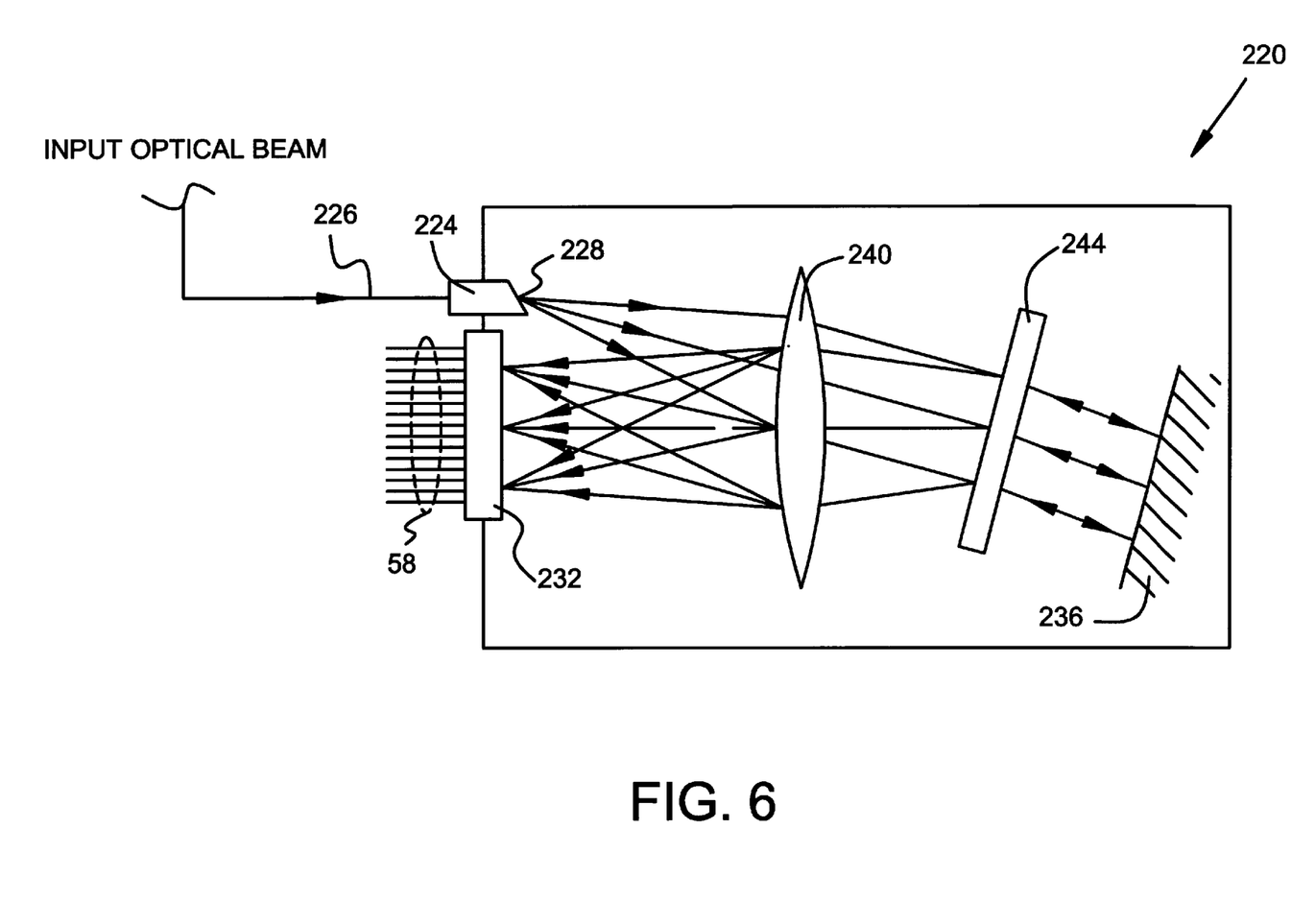
FIG. 6 is a schematic block diagram illustrating an alternative embodiment of the multi-channel optical performance monitoring device of the present invention, the depicted device including a transmissive diffraction grating and a reflective element providing for double pass of an input multi-channel light beam through the grating in order to achieve increased spatial separation of individual wavelengths of the input beam.

FIG. 6 shows a schematic block diagram illustrating an alternative embodiment of the multi-channel optical performance monitoring device of the present invention at 220, the depicted device providing for double pass of an input multi-channel light beam through a grating assembly in order to achieve increased spatial separation of individual wavelengths of the input beam as further explained below.

The device 220 includes: a fiber mounting assembly 224 for securing an input optical fiber 226 terminating in a fiber end 228 for radiating an input light beam received from the output of the combiner 24 (FIG. 1) and carrying the calibration wavelengths and the communication channel wavelengths; an opto-electronic detector unit 232 having an array of pixel detector elements 112 (FIG. 3) similar to the detector unit 44 (FIG. 1) each detector element being responsive to light beams incident thereon; a reflective element 236 for reflecting beams radiating from the fiber end 228 back toward the detector unit 232; a collimating and focusing lens 240 for collimating beams propagating from the fiber end 228 toward the reflective element 236, and for focusing beams propagating from the reflective element 236 toward the detector unit 232; and a transmissive grating assembly 244 for diffracting beams propagating between the lens 240 and the reflective element 236

In one embodiment, the grating assembly 240 is a transmissive grating that is similar to the grating assembly 50 (FIG. 1). The end 228 of the fiber 226 is located at the vicinity of the focal point of the lens 240. The lens 240 may be fabricated in the same manner as the lens 46 and 48 (FIG. 1) or in a similar manner.

During operation as an optical performance monitor, the input beam having mixed wavelengths and being radiated from the end 228 of the fiber is substantially collimated by the lens 240 and then impinged on the grating assembly 240 which diffracts and angularly separates the beam into a number of individual collimated beams according to the number of wavelengths in the mixed beam. The spatially separated beams are reflected and redirected back by the reflective element 236 toward grating assembly 240 which further diffracts the beams and makes further spatial separation of the individual wavelengths. The spatially dispersed collimated beams are then focused by the lens 240 and received directly by the opto-electronic detector unit 232. The opto-electronic detector unit 232 may be fabricated in the same manner as the detector unit 44 (FIG. 1) or in a similar manner. The opto-electronic detector unit 232 is responsive to beams incident thereon, and operative to provide data signals to a data signal processing such as that described above.

Assuming that the diffraction efficiency provided by the grating assembly 244 is substantially similar to that of the grating assembly 50 (FIG. 1), the dispersion provided by the device 220 is substantially increased over the dispersion provided by the device 38 (FIG. 1) because the input beam is passed though the grating assembly 244 twice in the device 220. The device 220 provides an increased spectral resolution without increasing the size of the device. An important advantage of the device 220 is that it provides a high resolution optical performance monitor with compact size and superior mechanical stability.

Figure 7:
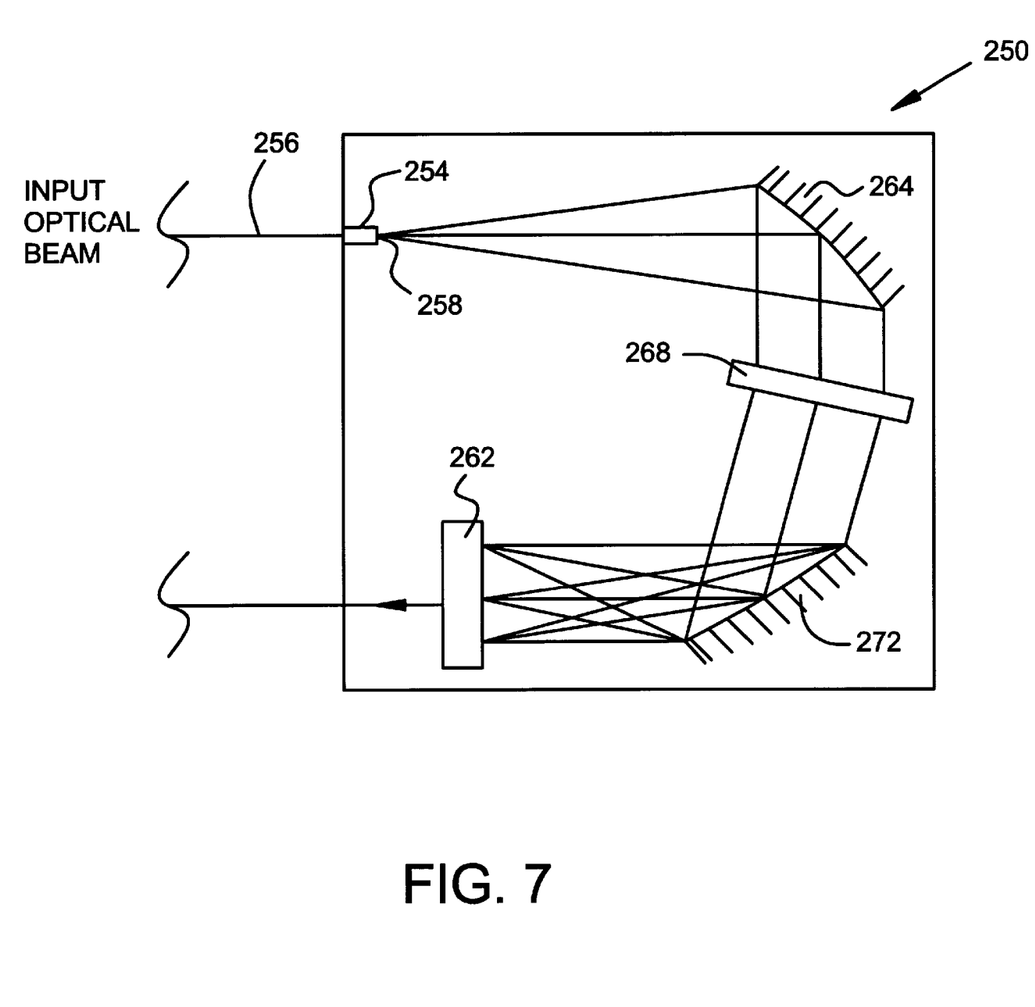
FIG. 7 is a schematic block diagram illustrating another alternative embodiment of a double pass type multi-channel optical performance monitoring device of the present invention.

FIG. 7 shows a schematic block diagram illustrating another alternative embodiment of a double pass type multi-channel optical performance monitoring device of the present invention at 250. The device 250 includes: a fiber mounting assembly 254 for securing an input optical fiber 256 terminating in a fiber end 258 for radiating an input light beam received from the output of the combiner 24 (FIG. 1) and carrying the calibration wavelengths and the communication channel wavelengths; an opto-electronic detector unit 262 having an array of pixel detector elements 112 (FIG. 3) similar to the detector unit 44 (FIG. 1) each detector element being responsive to light beams incident thereon; a first reflective surface 264 for collimating and focusing the input beam radiated from the input fiber end 258; a transmissive grating 268 including a diffractive element formed from a photosensitive medium for diffracting and spatially separating beams propagating from the input fiber end via the first reflective surface 264; and a second reflecting surface 272 for receiving the spatially separated beams from the grating assembly, for and reflecting the spatially separated beams toward the opto-electronic detector unit 262

The components of the device 250 are similar to the components of the device 38 (FIG. 1) except that the off-axis reflective mirrors 264 and 272 are used to replace the individual lenses 46 and 48 (FIG. 1). The surfaces of the first and second reflective mirrors 264 and 272 are preferably substantially polished and coated with high reflection coating to enhance the high reflectance in the aforementioned radiation range. The surface of the mirrors can be made either spherical or non-spherical shape to collimate and focus light beams. It is noted that this alternative embodiment provides an advantage of low mechanical and environmental stress responses because the mirror assemblies 264 and 272 can be made by diamond turning techniques by machining metal or low expansion materials, such as low expansion metal, plastic, glass or ceramic materials. The same materials can be machined for the base and mounting structures of the monitoring device, or the mirrors may be even machined onto the device body. Thus all the main elements in 180 may be formed to be monolithic.

The device 250, which includes optical components machined on a single body, provides the advantage of being rugged, and therefore substantially immune to stress and temperature variations. Furthermore, alignment of optical components of the device 250 is easy because the optical components are machined onto a single body.

An important advantage of the device 250 is that it provides an optical performance monitor having low or zero temperature dependency. The device 250 also enables easy optical alignment and construction.

The invention provides an optical performance monitoring device for fiber optic communication networks, in particular, a DWDM channel monitoring device with low insertion loss, and capability to handle a large number of channels in a small mechanical package. The device is small, lightweight, substantially immune to temperature variation, polarization variation and stress-induced instability, and is also inexpensive to produce.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

We claim:

1. A system for monitoring the optical performance of a fiber optic network including an optical fiber carrying a main communication signal stream having a plurality of different channels each having an associated channel wavelength, the system comprising:

a fiber tapping means communicatively coupled with the main optical fiber for extracting a tapped communication signal from the main signal stream, the tapped communication signal including the plurality of channels each having an associated communication wavelength;

means for generating a calibration signal including a plurality of calibration wavelengths;

means for combining said tapped communication signal and said calibration signal to generate a combined signal including said communication wavelengths and said calibration wavelengths;

a multi-channel monitoring device including,
        an input optical fiber for receiving the combined signal and having an input fiber end for radiating an input light beam including said communication wavelengths and said calibration wavelengths,
        a detector unit having an array of pixel detector elements each being responsive to light beams incident thereon, and operative to generate an associated data signal,
        collimating and focusing means for collimating and focusing beams propagating between said fiber end and said detector unit, and
        a transmissive grating assembly for diffracting and spatially separating beams propagating between said input fiber end and said detector unit,
        said grating assembly, collimating and focusing means, and pixel detector elements being configured so that said diffracted beams are spatially separated and focused onto associated ones of said detector elements according to associated ones of said communication wavelengths and said calibration wavelengths; and a data processing unit for receiving said data signals from said detector unit, and being operative to provide information indicative of the intensities and wavelengths associated with each of the channels of the main communication signal.

2. A system as recited in claim 1 wherein said grating assembly includes a volume phase grating (VPG) fabricated from high efficiency DCG material.

3. A system as recited in claim 1 wherein said grating assembly includes a volume phase grating disposed at a predetermined angular orientation with respect light beams incident thereon in order to optimize diffraction efficiency, and to optimize a first order of diffraction for a predetermined wavelength range.

4. A system as recited in claim 1 wherein said collimating and focusing means includes:

a first lens for collimating said input beam toward said grating assembly;

a second lens having a focal plane located at a surface of the pixel detector elements of the detector unit, said second lens for receiving the spatially separated beams from said grating assembly, and for focusing said spatially separated beams onto said pixel detector elements of said detector unit.

5. A system as recited in claim 1 wherein said transmissive grating assembly includes:

at least one substrate; and a diffractive element including a photosensitive medium providing a volume hologram.

6. A system as recited in claim 5 wherein said diffractive element is formed by performing a holographic process utilizing the photosensitive medium.

7. A system as recited in claim 1 wherein each of said pixel detector elements of the detector includes InGaAs.

8. A system as recited in claim 1 wherein said detector unit is configured so that a plurality of said pixel detector elements of the array provide for monitoring a single one of said communications wavelengths.

9. A system as recited in claim 1 wherein said means for generating a calibration signal includes:

a light source providing a source light beam;

a plurality of bandpass filters each being communicatively coupled to receive said source light beam from said source, and being operative to filter said source light beam, and to pass an associated one of said plurality of calibration wavelengths; and means for combining said calibration wavelengths passed by said filters to provide said calibration signal.

10. A system as recited in claim 9 wherein said light source is operative to provide a broadband spectrum light beam.

11. A system as recited in claim 10 wherein each of said bandpass filters includes a fiber Bragg grating.

12. A system as recited in claim 11 wherein each of said bandpass filters further includes a thermal electrical cooler for temperature stabilizing said gratings.

13. A system as recited in claim 1 wherein said data signal processing unit is operative to perform a calibration process for calibrating positional relationships between said spatially diffracted beams associated with said communication wavelengths and said associated pixel detector elements, said calibration process using said calibration wavelengths as standards to calibrate said positional relationships.

14. A system as recited in claim 1 wherein said collimating and focusing means includes:
   a first lens for collimating said input beam toward said grating assembly; and
   a reflective element for reflecting said spatially separated beams received from said grating assembly back toward said detector unit via said grating assembly, thereby providing a second pass through said grating assembly in order to further diffract and make further spatial separation of said input beam according to said associated communication wavelengths and said associated calibration wavelengths.

15. A system as recited in claim 1 wherein said collimating and focusing means includes:
   a first off-axis reflective surface for collimating and focusing said input beam toward said grating assembly; and
   a second off-axis reflective surface for receiving the spatially separated beams from the grating assembly, and for reflecting the spatially separated beams toward the detector unit.

16. A system as recited in claim 15 wherein said collimating and focusing means includes:
   a body including a chamber formed therein;
   a first off-axis reflective surface formed on a first wall of said chamber for collimating and focusing said input beam toward said grating assembly; and
   a second off-axis reflective surface formed on a second wall of said chamber for receiving the spatially separated beams from the grating assembly, and for reflecting the spatially separated beams toward the detector unit.

17. A multi-channel monitoring device for monitoring the optical performance of a fiber optic network including an optical fiber carrying a main communication signal stream having a plurality of different channels each having an associated channel wavelength, the device being used with a fiber optic splitter communicatively coupled with the main optical fiber for extracting a tapped communication signal from the main signal stream, the tapped communication signal including the plurality of channels each having an associated communication wavelength, a calibration signal generator for generating a calibration signal including a plurality of calibration wavelengths, and a combiner for combining the tapped communication signal and the calibration signal to generate a combined signal including the communication wavelengths and the calibration wavelengths, the device including:
   an input optical fiber for receiving the combined signal, and having an input fiber end for radiating an input light beam including said communication wavelengths and said calibration wavelengths;
   a detector unit having an array of pixel detector elements each being responsive to light beams incident thereon, and operative to generate an associated data signal;
   collimating and focusing means for collimating and focusing beams propagating between said fiber end and said detector unit; and
   a transmissive grating assembly for diffracting and spatially separating beams propagating between said input fiber end and said detector unit;
   said grating assembly, collimating and focusing means, and pixel detector elements being configured so that said diffracted beams are spatially separated and focused onto associated ones of said detector elements according to associated ones of said communication wavelengths and said calibration wavelengths.

18. A system as recited in claim 17 wherein said grating assembly includes a volume phase grating (VPG) fabricated from high efficiency DCG material.

19. A system as recited in claim 17 wherein said grating assembly includes a volume phase grating disposed at a predetermined angular orientation with respect light beams incident thereon in order to optimize diffraction efficiency, and to optimize a first order of diffraction for a predetermined wavelength range.

20. A system as recited in claim 17 wherein said collimating and focusing means includes:
   a first lens for collimating said input beam toward said grating assembly;
   a second lens having a focal plane located at a surface of the pixel detector elements of the detector unit, said second lens for receiving the spatially separated beams from said grating assembly, and for focusing said spatially separated beams onto said pixel detector elements of said detector unit.

21. A system as recited in claim 17 wherein said transmissive grating assembly includes:
   at least one substrate; and
   a diffractive element including a photosensitive medium providing a volume hologram.

22. A system as recited in claim 21 wherein said diffractive element is formed by performing a holographic process utilizing the photosensitive medium.

23. A system as recited in claim 17 wherein each of said pixel detector elements of the detector includes InGaAs.

24. A system as recited in claim 17 wherein said detector unit is configured so that a plurality of said pixel detector elements of the array provide for monitoring a single one of said communications wavelengths.

25. A system as recited in claim 17 wherein said collimating and focusing means includes:
   a first lens for collimating said input beam toward said grating assembly; and
   a reflective element for reflecting said spatially separated beams received from said grating assembly back toward said detector unit via said grating assembly, thereby providing a second pass through said grating assembly in order to further diffract and make further spatial separation of said input beam according to said associated communication wavelengths and said associated calibration wavelengths.

26. A system as recited in claim 17 wherein said collimating and focusing means includes:
   a first off-axis reflective surface for collimating and focusing said input beam toward said grating assembly; and
   a second off-axis reflective surface for receiving the spatially separated beams from the grating assembly, and for reflecting the spatially separated beams toward the detector unit.

27. A system as recited in claim 26 wherein said collimating and focusing means includes:
   a body including a chamber formed therein;

a first off-axis reflective surface formed on a first wall of said chamber for collimating and focusing said input beam toward said grating assembly; and a second off-axis reflective surface formed on a second wall of said chamber for receiving the spatially separated beams from the grating assembly, and for reflecting the spatially separated beams toward the detector unit.

28. A system for monitoring the optical performance of a fiber optic network including an optical fiber carrying a main communication signal stream having a plurality of different channels each having an associated channel wavelength, the system comprising:

a fiber tapping means communicatively coupled with the main optical fiber for extracting a tapped communication signal from the main signal stream, the tapped communication signal including the plurality of channels each having an associated communication wavelength;

means for generating a calibration signal including a plurality of calibration wavelengths;

means for combining said tapped communication signal and said calibration signal to generate a combined signal including said communication wavelengths and said calibration wavelengths;

a multi-channel monitoring device including,
an input optical fiber for receiving the combined signal, and having an input fiber end for radiating an input light beam including said communication wavelengths and said calibration wavelengths, a detector unit having an array of pixel detector elements each being responsive to light beams incident thereon, and operative to generate an associated data signal, collimating and focusing means for collimating and focusing beams propagating between said fiber end and said detector unit, and a transmissive grating assembly for diffracting and spatially separating beams propagating between said input fiber end and said detector unit, said grating assembly, collimating and focusing means, and pixel detector elements being configured so that said diffracted beams are spatially separated and focused onto associated ones of said detector elements according to associated ones of said communication wavelengths and said calibration wavelengths; and a data processing unit for receiving said data signals from said detector unit, and being operative to provide information indicative of the intensities and wavelengths associated with each of the channels of the main communication signal, said processing unit also being operative to perform a calibration process for calibrating positional relationships between said spatially diffracted beams associated with said communication wavelengths and said associated pixel detector elements, said calibration process using said calibration wavelengths as standards to calibrate said positional relationships.

* * * * *